April 22, 1930.  S. HUNT  1,755,957
MACHINE FOR THE MANUFACTURE OF HOLLOW BLOWN GLASS ARTICLES
Filed Jan. 19, 1928  3 Sheets-Sheet 1
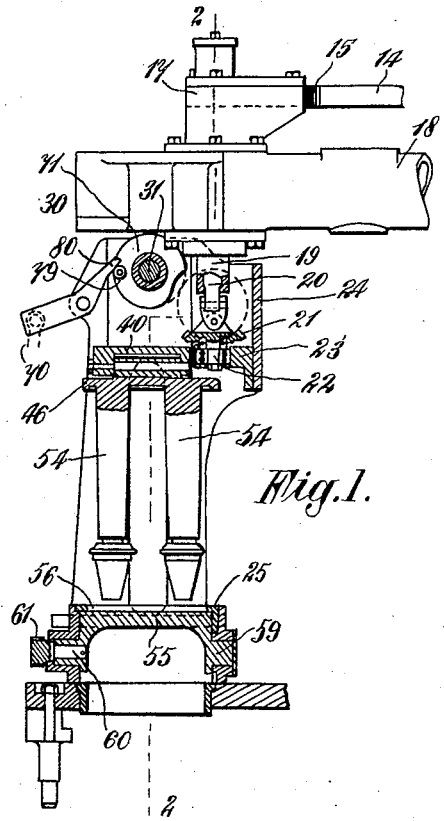
Fig.1.
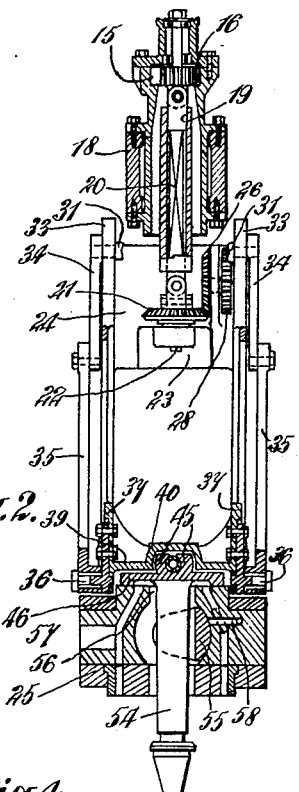
Fig.2.
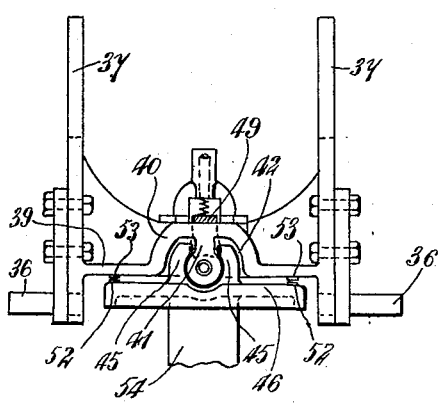
Fig.3.
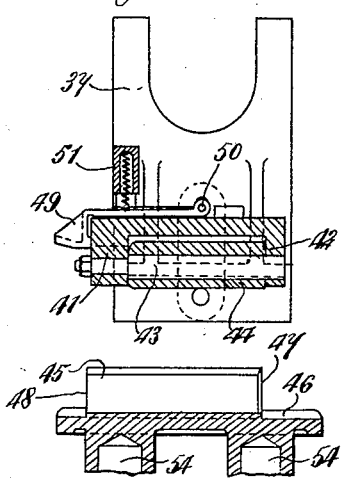
Fig.4.
Fig.5.
INVENTOR
SYDNEY HUNT,
BY
HIS ATTORNEY

INVENTOR
SYDNEY HUNT,
BY
HIS ATTORNEYS

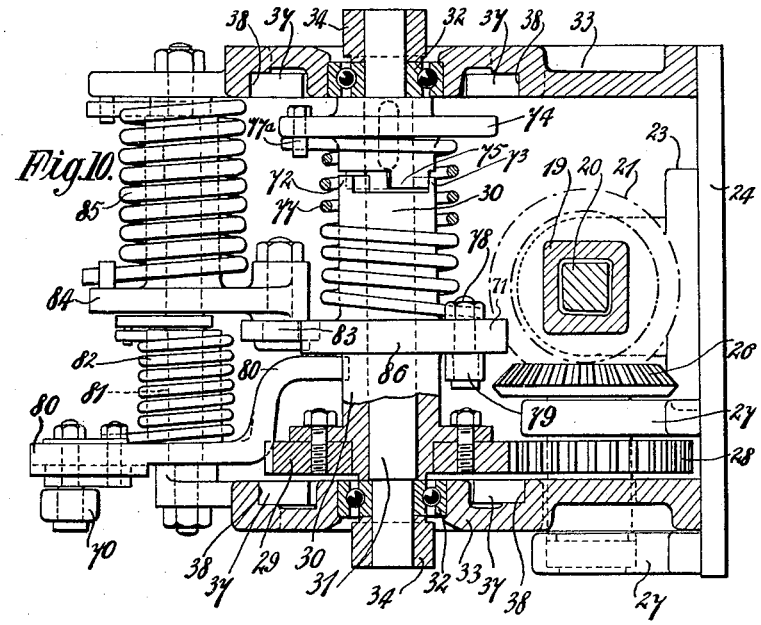
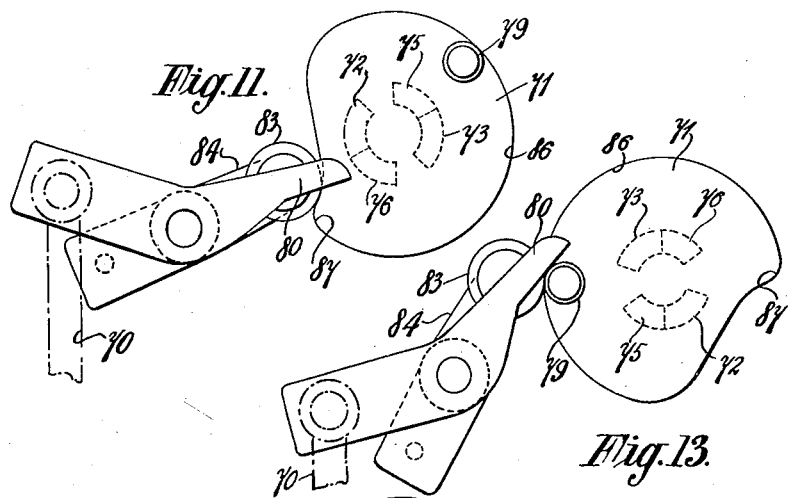
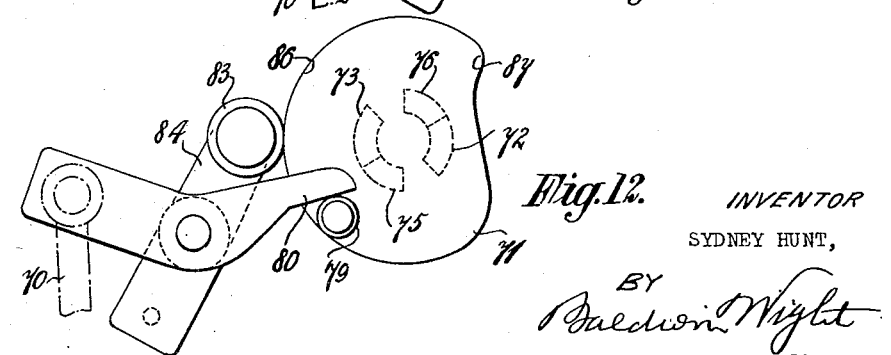

Patented Apr. 22, 1930

1,755,957

UNITED STATES PATENT OFFICE

SYDNEY HUNT, OF BIRMINGHAM, ENGLAND

MACHINE FOR THE MANUFACTURE OF HOLLOW-BLOWN GLASS ARTICLES

Application filed January 19, 1928. Serial No. 247,851.

This invention relates to machines for the manufacture of hollow blown glass articles, and refers to that type of such machines in which a head is provided carrying a neck mould or its equivalent, with which head is adapted to co-operate, at one period, a sectional parison mould, and at another period, a sectional finishing mould, the open end of the parison mould being supplied with glass, for instance by dipping it beneath the surface of molten glass in a glass tank, and the mould filled by means of suction alone, produced through the head, or by suction in conjunction with some other means, after which the parison mould is opened, leaving the parison suspended from the neck mould or its equivalent, a sectional finishing mould being then closed about the parison and the article blown to shape by air at a suitable pressure introduced through the head.

With machines of this description it is usual to provide, in connection with the head, a plug which projects to a suitable extent into the neck mould and the top of the closed parison mould, such plug being intended to form the initial blow opening and to prevent the molten glass being drawn past the neck mould or its equivalent into the head. This plug is withdrawn at a suitable period, in order to enable the blowing air to be introduced and blowing to be effected at the required period or periods.

Difficulties have been experienced owing to the fact that both suction and blowing have to be effected through the head. The plug has to be lowered into the head, and the head efficiently sealed, when suction is to take place, after which the plug has to be raised and the head again efficiently sealed when blowing has to take place, and many expedients have been adopted for overcoming these difficulties.

According to one construction for instance, it has been proposed to mount the plug, or in the case of a plural mould a plurality of plugs, on a cover which is lowered into position on the head when suction is to take place, and then to raise the said cover carrying with it the plug or plugs, and to slide a secondary cover into position on the head, when blowing is to take place.

An object of the present invention is so to construct and operate a head of the foregoing description that a wide range of plugs can be employed in order that the machine shall be adaptable for making a wide range of blown glass articles. A further object is to enable the plugs to be easily interchanged or replaced in case of one or more becoming damaged or where it is required to vary the type of article to be produced. Another object is to provide a simple and efficient valve mechanism for enabling the change over from suction to blowing through the head, or vice versa to be conveniently effected whilst preserving the air tightness of the head or the portions of the head through which suction or blowing is being effected, such valve being moreover so constructed and arranged that it enables the plug or plugs to be readily brought into position and withdrawn at the required periods.

Other objects of the invention will be made apparent in the course of the description.

According to the invention the head is formed in the usual manner as a hollow casing, open at the top, and having passages for the exertion of suction in and the admission of blowing air to the interior thereof, the said passages being in communication with controlled sources of suction and blowing air. The head is also provided with a suitable opening or openings appropriately located to correspond with the aperture or apertures of the neck mould or neck moulds and the parison mould. Mounted in the casing of the head is a rotary valve which is so shaped and disposed that in one position it leaves a clear passageway for the insertion and withdrawal of the plug or plugs into and from the interior of the neck mould or moulds and the top of the parison mould, and also so sets the parts that the suction can operate at the required times. In the other position of the valve, after the plugs have been removed, it closes the passageway between the interior of the mould or moulds and the atmosphere and sets the parts into such a position that blowing can be effected through the head at the required times.

The plug or plugs are carried on the underside of a cover, which will be termed "the vacuum cover," which cover is removed by suitable mechanism from the head before the valve is turned into the closed position and restored to position on the head after the valve has been turned to the open position.

Suitable mechanism is provided for raising and lowering the vacuum cover at appropriate times, for exerting any necessary pressure on the said cover when in the closed position to withstand the inrush of the glass, and for rotating the valve, the mechanism being so timed that the vacuum cover is withdrawn to a sufficient extent for the plug or plugs to clear the valve before the latter is rotated into the closed position and for rotating the valve back to the open position before the vacuum cover and plugs are again caused to return.

The invention will now be more fully described with reference to the accompanying drawings which illustrate its application to a machine for the manufacture of hollow glass articles such as bottles, the said machine including a framework constituting a plurality of bottle making units rotating about a fixed central column carrying the principal cams from which the various operations are controlled.

Only those portions of the construction are illustrated which are essential for the understanding of the invention, the general structure and operation of a machine of the foregoing description being well known.

In the drawings:

Fig. 1 is a fragmentary elevation partly in section showing the end of one of the radial arms of the rotary framework, vacuum cover and plugs in the upper position, the rotary valve, and associated mechanism.

Fig. 2 shows a section on the line 2—2 Fig. 1, certain parts being omitted for clearness and the vacuum cover and plugs being shown in the lower position.

Fig. 4 is a sectional side elevation of Fig. 3, the vacuum cover and plugs being removed.

Fig. 5 shows in sectional side elevation a portion of the vacuum cover and plugs to be attached to the cradle shown in Fig. 4.

Fig. 10 shows to a still larger scale a plan view partly in section of the crank shaft and associated driving mechanism for effecting the operation of the vacuum cover and plugs and the rotary valve.

Figs. 11, 12 and 13 show fragmentary and diagrammatic elevations illustrating the method of operating the rotary valve and reinforcing means for maintaining the vacuum cover in the closed position.

Figure 6:
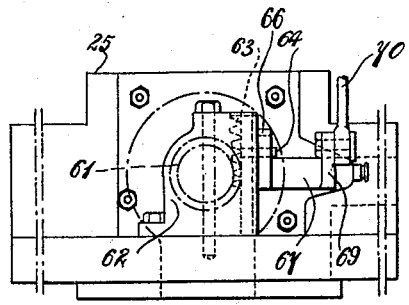
Fig. 6 shows also to a larger scale a front elevation of a portion of the blowing head comprising the valve chamber.
Figure 9:
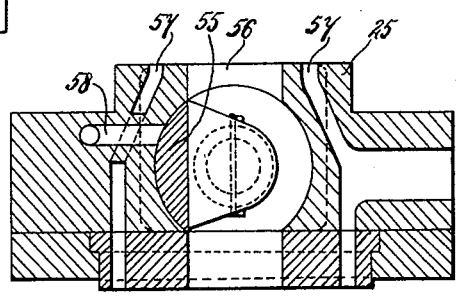
Fig. 9 is a section on the line 9—9 Fig. 7.
Figure 7:
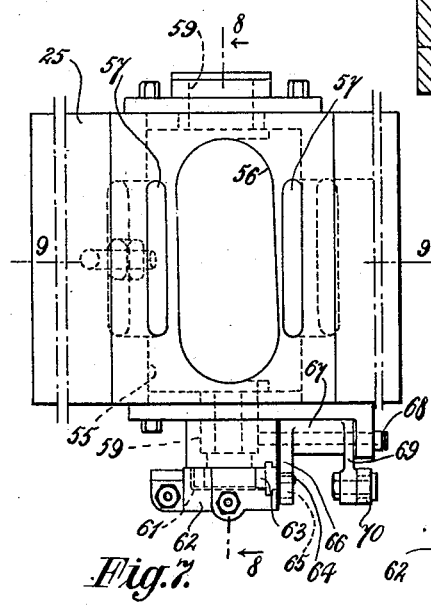
Fig. 7 shows a plan of Fig. 6.
Figure 8:
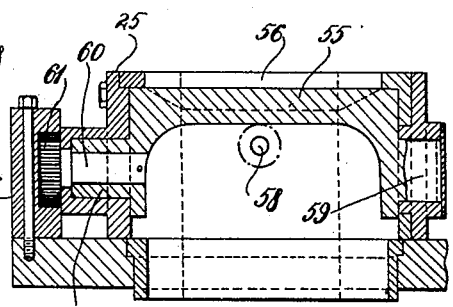
Fig. 8 is a section on the line 8—8 Fig. 7.

14 (Figs. 1 and 2) shows a rod termed "the plug rod" which co-operates with a fixed cam (not shown) associated with the central column of the machine. This rod 14 has a positive movement from the cam in one direction and a return movement by means of a spring (not shown). At its outer end the rod 14 is formed as a rack 15 which meshes with a pinion 16 rotatably carried in a casing 17 supported by the end of a radial arm 18. The pinion 16 is connected by a universal joint with a sleeve 19 having a squared aperture towards the end thereof in which is telescopically mounted a squared rod 20. The lower end of the squared rod 20 is connected to a bevel wheel 21 by a universal joint, the bevel wheel being mounted upon a vertical shaft 22 supported in a bearing carried by a bracket 23 attached to a casting or framework 24, which casting or framework is suitably secured to the top of a blow head casing 25.

The telescopic members 19 and 20 permit the blow head to be adjusted with regard to the radial arm 18 without interrupting the driving action between the parts.

Figure 3A:
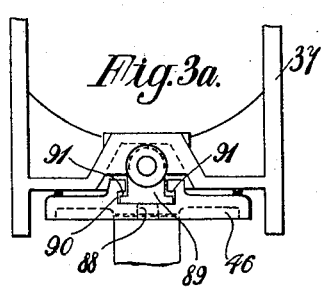
Fig. 3 shows in elevation and to a larger scale the cradle for raising and lowering the vacuum cover and plugs, and Fig. 3ª shows a modified form thereof.

The bevel wheel 21 meshes with another bevel wheel 26 (Figs. 2 and 10) mounted upon a horizontal shaft carried in bearing brackets 27 attached to the casing 23. On this horizontal shaft is mounted a toothed wheel 28 which meshes with another toothed wheel 29 attached to a sleeve 30 mounted to turn freely upon a crank shaft 31. The shaft 31 towards its ends is reduced and mounted in bearings 32 supported by bracket like portions 33 of the casing 24. At the ends the shaft 31 has secured thereto by cotter pins or otherwise, crank arms 34 (Figs. 2 and 10). The crank arms 34 come at the outside of the portions 33 of the casing and have pivotally attached to their free extremities connecting rods 35. The other ends of the connecting rods 35 are pivotaly connected to pins or trunnions 36 projecting from the sides of a cradle framework as shown in Figs. 2 and 3. This cradle framework comprises two vertical sliding members 37, forked at their upper ends and adapted to slide in recessed portions 38 (Fig. 10) of the framework or casing 33. It also comprises a lower portion 39 arched at the centre at 40. The front of the arched portion has a downwardly extending lug 41 formed integrally therewith and the rear of this arched portion has a dowwardly extending web 42. Between the lug 41 and web 42 is mounted a pin 43 having a bush 44 thereon. Between the exterior of the bush 44 and the interior of the arched portion 40 a channel is left. This is adapted to receive hook-like portions 45 arranged in opposite directions and with a circular bore between them to form a guide attached to the upper surface of a vacuum plate 46. The length of the portions 45 is such that when the hook-like portions are slidden one on each side of the lug 41 to come on each side of the bush 44, to the maximum extent, the rear edges 47 come into contact with the web 42. At the same time the front edges 48 come flush with the front of the lug 41. The vacuum plate is maintained in position by means of a spring pressed detent 49 pivoted at 50 and kept pressed downwards by a compression spring 51. The nose of the detent comes over the front of the lug 41 and projects to a desired extent on each side to engage a portion of the front surface 48 of the hook-like members 45. In this manner the vacuum plate is detachably secured to the cradle so that it readily can be changed.

52 are stops on the upper surface of the vacuum plate which co-operate with the stops 53 on the under surface of the portion 39 of the cradle, the arrangement being such that when normally mounted in position the vacuum cover is permitted a slight rocking motion about the axis of the pin 43. Similarly the whole cradle can rock to a slight extent about the axis of the pins 36. To the underside of the vacuum cover 46 are detachably or otherwise secured any desired number of plugs, for example in the drawings two plugs 54 are shown associated with the single cover 46, but it is of course understood that one plug alone may be employed or more than two.

The blow head casing 25 is open at the top and also comprises a valve casing (Figs. 1, 2, 6, 7, 8 and 9) which valve casing has mounted therein a valve plug 55 resembling a Corliss valve. The blowing head has the main opening 56 at the top and supplementary openings 57, all of which are adapted to be covered over by the vacuum cover when it is in its lower position. When the valve 55 is in the open position the opening 56 communicates directly through the head to the underside thereof which is in communication with the neck mould (not shown). When however the valve 55 is moved to the closed position (Figs. 1 and 8) the interior of the head is shut off from the opening 56 and is placed into communication with the passage 58 for the supply of compressed air for effecting the blowing. The valve plug is mounted upon trunnions 59 suitably supported in the head and one of these trunnions has attached thereto a spindle 60 projecting to the exterior, on the end of which is mounted a pinion 61 (Figs. 1, 6, 7 and 8). This pinion is covered in by a detachable casing portion 62 which also forms a guide for a rack 63 which engages with the pinion 61. 64 is a pin projecting from the rear of the rack to the exterior of the casing, which pin passes into a slot 65 in the end of a lever 66 attached to a sleeve 67 mounted to turn upon a pin 68 secured to the casing. The sleeve 67 is also formed with another lever 69 adapted to be connected to a link or connecting rod 70. When the link or connecting rod 20 is pulled up or down it causes the lever 66 to be moved through a desired angle which by the slot and pin connection causes the rack 63 to be reciprocated. The reciprocation of the rack causes the pinion 61 to be turned through a desired angle and this effects the opening and closing of the valve 55. In the extreme positions, stop means of a resilient or other nature may be arranged for the valve, for example in connection with the rack or otherwise.

The sleeve-like casting 30 mounted to turn on the crank shaft 31 has a flange-like cam 71 formed therewith and also extends on the other side of this cam. The end of the sleeve remote from the toothed wheel 29 is formed as one-half of a clutch and comprises two projecting portions 72 and 73. Attached to the shaft 31 by a suitable feather is a clutch member 74 comprising a sleeve with two projections 75 and 76. These projections 75 and 76 are adapted to project in the gaps between the projections 72 and 73 on the sleeve 31 leaving, in the position shown in Figs. 10 and 11, a gap of about 45 degrees between the projections 72 and 75 and 73 and 76. 77 is a torsion spring around the sleeve 30, one end of which comes behind a pin or projection 77ª on the disc portion of the clutch member 74 and the other end of which comes behind a bolt 78 on the flange 71.

79 is a roller mounted upon the bolt 78 and projecting from one face of the cam flange 71. This roller is adapted to co-operate with a valve lever 80 formed with a sleeve mounted loosely upon a fixed spindle 81 extending between lugs on the casing members 33. One end of the lever 80 has attached thereto the other end of the rod 70, so that this rod connects the two levers 69 and 80. 82 is a torsion spring around the sleeve 81 tending to keep the rod 70 pulled upwards which also tends to keep the valve 55 in the open position, that is the position shown in Fig. 9.

The action of certain parts of the mechanism will now be explained. Assume that the vacuum cover 46 is on its seat and the plugs 54 are hard home on the neck moulds, that is the position in which the cranks 34 are nearly at their dead centre and directed vertically downwards (Fig. 2). In this position the plug rod 14 is at the deepest recess of its associated cam and the positive movement to be given to it is about to commence. The parts are so shaped and proportioned that at the end of this positive movement the rod 14 through the intermediary gearing and mechanism will in the example shown in the drawing turn the pinion 29 through 225 degrees.

As the pinion 29 is thus moved it drives the clutch member 75 through the intervention of the torsion spring 77 through 180 degrees and brings the cranks 34 and the spindle 31 to the upper dead centre position, where the cranks are prevented from having further movement by suitable stop means. Consequently the crank spindle 31, clutch member 74 and cranks 34 remain at this top dead centre being kept forcibly in this position by the torsion of the spring 77, which spring however has additional torsional stress given thereto by the continued movement of the pinion 29 for the further 45 degrees of the movement which the sleeve 30 is compelled to make after the vacuum plate 46 and plugs 54 are in their upper position.

During the 180 degrees movement the roller 79 has moved from the position shown in Fig. 11 to the position shown in Fig. 12, where it will be seen the roller makes contact with the lever 80. During the last 45 degrees of the movement the roller 79 forces the arm of the lever with which it is in contact upwards to the position shown in Fig. 13 which causes the rod 70 to be moved downwards in turn causing the valve 55 to be moved from the open to the closed position. This action is performed against the torsion of the spring 82 which spring tends always to keep the valve 55 in the full open position. By the downward movement of the rod 70 the valve has been brought into such a position that the head is sealed from the exterior and is ready to have blowing pressure applied thereto.

The parts are now in the position they are caused to take up by the plug rod 14 which has come to the end of the positive stroke, and the following spring pressures are in operation. The compression spring associated with the rod 14 for its return, is fully compressed and offering its full value for the return stroke. The torsion spring 77 is wound up for 45 degrees beyond its normal driving pressure and the valve torsion spring 82 is at its fullest strength trying to open the closed valve 55.

The jaws of the projections 72 and 73 have come against the projections 75 and 76 respectively during the last 45 degrees of movement (Fig. 13) and consequently the first movement that takes place on the return stroke is for the torsion spring 77 to unwind to a slight extent, and to cause the sleeve 30 to move through 45 degrees carrying with it the cam flange 71 and roller 79. This moves the roller 79 downwards from the lever 80 (Fig. 13) back to the position shown in Fig. 12, and also through the rod 70, the levers 69 and 66 and rack and pinion 63 and 61 effects the opening of the valve 55 bringing it to the position shown in Fig. 9. In other words the first motion on the return stroke is to open the valve 55 before the cranks 34 move away from their top dead centre position.

After the valve 55 has been fully opened, the projections 73 and 72 again come back into contact with the projections 75 and 76 respectively and the projections 73 and 72 owing to the reverse drive of the toothed wheel 29 now engage the projections 75 and 76 and carry the clutch member 74 around with the sleeve 30. This in turn causes the crank spindle 31 to be driven and the ensuing motion turns the crank spindle and the cranks through 180 degrees bringing the cranks nearly to the lower dead centre position, the expiring force of the compression spring associated with the rod 14 being used for this purpose.

It will thus be clearly seen that during the first part of the motion, that is from the position where the vacuum cover is seated upon the open portion of the head, the plugs are withdrawn through the opening in the valve before the rotary movement for closing the valve takes place, whilst during the converse movement, the valve is restored to the open position before the vacuum cover and plugs are lowered, thus avoiding all chance of fouling.

In order to increase the pressure by which the vacuum cover 46 is held upon its seating when the parts are in the lower position, the cam 71 and associated mechanism have been provided. The associated mechanism comprises a roller 83 bearing upon the cam surface and carried by a lever 84 formed or provided with a sleeve mounted to turn upon the fixed spindle 81. Around the sleeve of the lever 84 is mounted a strong torsion spring 85 one end engaging a projection attached to an extension of the casing 33 and the other end engaging a projection on the lever 84. The torsion spring 85 forces the roller 83 against the surface of the cam.

The object of the foregoing reinforcing mechanism is to provide supplementary power to the cranks 34 as these approach their dead centre position, to enable them to force the plugs 54 hard home, that is to supply the pressure required to make the plug shoulder seat itself on the neck ring mould.

Assuming again that the vacuum plate and plugs are in the lowermost position at the commencement of the upstroke, which is the position of the parts shown in Figs. 10 and 11, it will be seen that the cam 71 is so shaped that at the commencement of the action it has to force the roller 83 outwards immediately the upstroke starts and by so doing it winds up and puts further torsion upon the spring 85. The force required to do this must be supplied by the cooperation of the main cam (associated with the central column) and the rod 14, at the commencement of the positive movement of the rod 14, and when the compression spring associated with such rod is at its weakest. The force is exerted for a short period until the roller 83 rolls on the circular portion 86 of the cam, when no further force is required. The additional power that has been put into the spring 85 is stored ready for work, but is not imposing any reaction on the cam face (that is the cam associated with the central column) except for the negligible resistance of the roller 83 on the periphery of the cam 71. The completion of the positive stroke of the rod 14 calls for no further exertion of power as far as the spring 85 is concerned and does not impose pressure on the cam associated with the central column as is the case with the continuous compression taking place on the compression spring associated with the rod 14.

The reserve of power in the spring 85, however, is brought into service on the return stroke just when the power of the compression spring associated with the rod 14 is reaching its expiring stage. In the downstroke, when the same is nearly completed, the nose 87 of the cam 71 passes the roller 83 and the reserve pressure is released and exerted to force the incline of the rotary cam 71 towards the completion of the downstroke. The cam is formed in one with the sleeve 30, and this carries round the clutch member 74 and the crank shaft and cranks and forces them hard home towards, but not quite as far as the dead centre position. The reserve stress, acting through the toggle mechanism thus formed, assists the main compression spring to force the plugs home and lock the mechanism in its lowermost position securing a rigid condition for the whole mechanism whilst the plugs are in the operative position.

It should further be noted that the construction of the cradle 37 and plug carrier is such that while the cradle works as a vertically sliding cross head guided by rigid rectangular sliding faces, a certain amount of working clearance is necessary, which clearance comes into play at the end of the downstroke to permit the vacuum cover 46 to seat itself evenly upon the scraped surface of the blow head 25 and to permit a very small rocking movement in two directions to the vacuum cover. This enables it to make a seal which is allowed in the first place as the cradle is supported or hung from the connecting rods by pins or trunnions 36 affording rocking movement in one direction and in the second place the vacuum cover and plug holder is hung from the cradle by the circular elements 45 permitting a small rocking movement in a direction at right angles to the first.

The structure shown in Fig. 3ª resembles that shown in Fig. 3 with the exception that the vacuum cover 46 has an aperture 88 therethrough and that the bush 44 in place of being formed as a simple bush is formed on the under side as an inverted T guide 89. In place of the hooked members 45 the upper side of the vacuum cover 46 is formed with a T slot 90 in such a manner that a clearance 91 is left between the upper surface of the T piece 89 and the under surface of the overhanging parts of the T slot 90. When the vacuum cover is pressed hard home on its seating the under surface of the T member 89 closes the aperture 88 to the atmosphere, but when the mechanism is operated to raise the vacuum cover, at the first portion of the upward movement the T piece 89 moves away from the aperture 88 without moving the vacuum cover 46 owing to the clearance 91, and thus the vacuum seal is broken and air can enter through the aperture 88 to the under side of the vacuum cover 46. By this means the raising mechanism does not have to overcome the suction effort of the whole vacuum cover but before the vacuum cover is moved the pressure is equalized on both sides thereof. In Fig. 3ª the spring catch 49 is omitted for the sake of clearness.

Although the invention has been described with particular reference to a machine for the manufacture of glass articles comprising a rotary framework and a fixed central column, it will be understood that it may be adapted to other types of machines where found desirable.

Instead of adapting it to a machine in which the parison mould is dipped for the purposes of filling and then raised from molten glass in a glass tank, the invention may be adapted to turnover and other types of machines wherein a combined suction and blowing head is employed.

In place of utilizing cam mechanism for effecting the various movements, other mechanical means, fluid pressure motors or the like, may be employed.

What I claim and desire to secure by Letters Patent of the United States of America is:—

1. In a machine for the manufacture of hollow blown glass articles of the type comprising a combined open suction and blowing head and a cover adapted to be applied to the opening in the head, the said cover carrying at least one plug for the formation of the preliminary blow opening in a parison; a construction including a rotary valve located between the opening in the head and the neck mould, the said valve being so arranged that in one position it allows the plug to co-operate with the neck mould and the suction to be effective and in another position, when the plug and cover are withdrawn, closes the head to the outside and allows the blowing air to be effective.

2. In a machine having the features claimed in claim 1, a construction in which the rotary valve is so formed and located with respect to the passage for blowing air that it is adapted in one position to close the said passage and in another position to open the same, for the purposes set forth.

3. In a machine having the features claimed in claim 1, a construction in which co-operating timing mechanism is provided between the cover carrying the plug and the rotary valve in such a way that the cover and plug are removed from the head before the valve is rotated to the closed position and the valve rotated to the open position before the return of the cover and plug to the opening of the head, for the purposes set forth.

4. In a machine having the features claimed in claim 1, a construction including means for applying the cover to the head and supplementary means for retaining the cover in the applied position, for the purposes set forth.

5. In a machine having the features claimed in claim 1, a construction in which automatic means are provided tending to keep the rotary valve in the open position, that is the position in which the plug can pass through to and be withdrawn from the neck mould.

6. In a machine having the features claimed in claim 1, a construction in which the raising and lowering of the cover carrying the plug is effected by crank mechanism, substantially as described.

7. In a machine having the features claimed in claim 1, a construction in which the raising and lowering of the cover carrying the plug is effected by crank mechanism, and in which the cover reaches the closed position before the crank mechanism reaches its dead centre so as to enable the crank mechanism to be used as a toggle through which further pressure may be applied tending to keep the cover on its seat.

8. In a machine having the features claimed in claim 1, a construction in which the means for carrying the cover includes connections permitting the cover to have a slight rotation about two axes at right angles to each other, for the purposes set forth.

9. In a machine having the features claimed in claim 1, a construction in which means are provided for equalizing the pressure on both sides of the cover just prior to the removal thereof from the opening in the head.

10. In a machine having the features claimed in claim 1, a construction in which an aperture is provided through the cover adapted to be closed by suitable means when the cover is forced to the closed position and opened by the mechanism just prior to the actual removal of the cover from the opening in the head for the purposes set forth.

11. A machine having the features claimed in claim 1, in which the rotary valve has a spindle projecting to the exterior, said spindle being furnished with means for rotating the valve at appropriate periods in timed relation to the movements of the cover and plug.

12. In a machine having the features claimed in claim 1, a construction including gearing rotated by the machine mechanism, the last element of the gearing having attached thereto a sleeve mounted rotatably upon a crank shaft and also being formed with one-half of a clutch, a second clutch member keyed to the crank shaft and engaging the first clutch member with a desired amount of lost motion, a torsion spring between the sleeve and the second clutch member, cranks on the crank shaft, and means attached to the cranks for carrying the cover and plug, substantially as described.

13. A machine having the features claimed in claim 1, in which the means for carrying the cover and plug include a cradle mounted to work in guides in a suitable framework attached to the head and connected to the cranks by links, substantially as described.

14. In a machine having the features claimed in claim 1, a construction in which the rotation of the valve is effected by a toothed pinion mounted upon the spindle of the valve, gearing with a reciprocating rack operated by a lever caused to be moved by the rocking lever through suitable intermediary mechanism, substantially as and for the purposes set forth.

15. In a machine having the features claimed in claim 1, mechanism adapted to effect the movements of the cover and plug with respect to the head for the purposes set forth.

16. In a machine having the features claimed in claim 1, mechanism adapted to effect the movements of the cover and plug with respect to the head, and to rotate the valve at appropriate times, for the purposes set forth.

17. In a machine having the features claimed in claim 1, a construction including gearing rotated by the machine mechanism, the last element of the gearing having attached thereto a sleeve mounted rotatably upon a crank shaft and also being formed with one half of a clutch, a second clutch member keyed to the crank shaft and engaging the first clutch member with a desired amount of lost action, a torsion spring between the sleeve and the second clutch member, cranks on the crank shaft, means attached to the cranks for carrying the cover and plug, a roller carried by the said sleeve, said roller being adapted to co-operate with one end of a rocking lever coming in the path of the roller, the other end of the lever being operatively connected with the rotary valve, all for the purposes set forth.

18. In a machine having the features claimed in claim 1, a construction including gearing rotated by the machine mechanism, the last element of the gearing having attached thereto a sleeve mounted rotatably upon a crank shaft and also being formed with one half of a clutch, a second clutch member keyed to the crank shaft and engaging the first clutch member with a desired amount of lost motion, a torsion spring between the sleeve and the second clutch member, cranks on the crank shaft, means attached to the cranks for carrying the cover and the plug, a cam carried by the sleeve, a lever carrying a roller, a second torsion spring around the axle of the lever and arranged to press the roller on to the surface of the cam, the cam being so shaped and disposed that, when rotated, the roller is moved to additionally stress said second spring, the additional stress being stored and subsequently transmitted through the cam and the crank shaft to the cover.

19. In a machine for the manufacture of hollow blown glass articles, of the type comprising a combined open suction and blowing head and a cover adapted to be applied to the opening in the head, the said cover carrying at least one plug for the formation of the preliminary blow opening in a parison; a construction including means located between the opening in the head and the neck mold, the said means being so formed and arranged that in one position it allows the plug to co-operate with the neck mold and the suction to be effected, and in another position, when the plug and cover are withdrawn, closes the head to the outside and allows the blowing air to be effective.

20. In a machine for the manufacture of hollow blown glass articles, of the type comprising a combined open suction and blowing head and a cover adapted to be applied to the opening in the head, the said cover carrying at least one plug for the formation of the preliminary blow opening in a parison; a construction including a valve located between the opening in the head and the neck mold, the said valve being so arranged that in one position it allows the plug to cooperate with the neck mold and the suction to be effected and in another position, when the plug and cover are withdrawn, closes the head to the outside and allows the blowing air to be effective.

In witness whereof I affix my signature.

SYDNEY HUNT.